US012757144B2

(12) United States Patent
Cui et al.

(10) Patent No.: US 12,757,144 B2
(45) Date of Patent: Oct. 6, 2026

(54) GRADUAL TIMING ADJUSTMENT FOR WIRELESS DEVICES IN A NON-TERRESTRIAL NETWORK

(71) Applicant: Apple Inc., Cupertino, CA (US)

(72) Inventors: Jie Cui, San Jose, CA (US); Yang Tang, San Jose, CA (US); Qiming Li, Beijing (CN); Chunxuan Ye, Cupertino, CA (US); Manasa Raghavan, Sunnyvale, CA (US); Xiang Chen, Campbell, CA (US); Huaning Niu, San Jose, CA (US); Dawei Zhang, Saratoga, CA (US); Hong He, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 18/726,251

(22) PCT Filed: Jan. 6, 2022

(86) PCT No.: PCT/CN2022/070491
§ 371 (c)(1),
(2) Date: Jul. 2, 2024

(87) PCT Pub. No.: WO2023/130309
PCT Pub. Date: Jul. 13, 2023

(65) Prior Publication Data

US 2025/0071710 A1 Feb. 27, 2025

(51) Int. Cl.
*H04W 56/00* (2009.01)
*H04W 84/06* (2009.01)

(52) U.S. Cl.
CPC ....... *H04W 56/005* (2013.01); *H04W 56/007* (2013.01); *H04W 56/009* (2013.01); *H04W 84/06* (2013.01)

(58) Field of Classification Search
CPC ............ H04B 7/1851; H04W 56/0045; H04W 56/005; H04W 56/007; H04W 56/009; H04W 84/06
See application file for complete search history.

(56) References Cited

U.S. PATENT DOCUMENTS

2019/0394770 A1 12/2019 Wang
2021/0392597 A1* 12/2021 Xu ...................... H04W 56/005
(Continued)

FOREIGN PATENT DOCUMENTS

WO 2021057442 4/2021

OTHER PUBLICATIONS

International Search Report for PCT Patent Application No. PCT/CN2022/070491; Sep. 26, 2022.
(Continued)

*Primary Examiner* — Kashif Siddiqui
(74) *Attorney, Agent, or Firm* — Kowert, Hood, Munyon, Rankin & Goetzel, P.C.

(57) ABSTRACT

This disclosure relates to techniques for a wireless device to perform gradual timing adjustments in a non-terrestrial wireless communication system. According to the techniques described herein, a wireless device may establish a non-terrestrial network based wireless link with a cellular base station. The wireless device may detect a trigger for changing a gradual timing adjustment rate from a first gradual timing adjustment rate to a second gradual timing adjustment rate. The wireless device may determine a time window for which to perform gradual timing adjustment at the second gradual timing adjustment rate. The wireless device may perform gradual timing adjustment at the second gradual timing adjustment rate for the time window.

20 Claims, 6 Drawing Sheets

(56) References Cited

U.S. PATENT DOCUMENTS

| | | | | |
|---|---|---|---|---|
| 2022/0263570 | A1* | 8/2022 | Wang | H04B 7/18513 |
| 2023/0422195 | A1* | 12/2023 | Yao | H04W 56/0045 |
| 2024/0031009 | A1* | 1/2024 | Zhang | H04B 7/18513 |

OTHER PUBLICATIONS

Qualcomm Inc. "Timing requirements"; 3GPP TSG-RAN WG4 Meeting #101-e R4-2119588; Nov. 12, 2021.

Huawei et al. "Discussion on NTN timing related requirements"; 3GPP TSG-RAN WG4 Meeting #101-e R4-2118834; Nov. 12, 2021.

* cited by examiner

GRADUAL TIMING ADJUSTMENT FOR WIRELESS DEVICES IN A NON-TERRESTRIAL NETWORK

PRIORITY INFORMATION

This application is a national phase entry of PCT application number PCT/CN2022/070491, entitled "Gradual Timing Adjustment for Wireless Devices in a Non-Terrestrial Network," filed Jan. 6, 2022, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for a wireless device to perform gradual timing adjustments in a non-terrestrial wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc. The proliferation in wireless communication techniques and standards can encompass terrestrial networks as well as non-terrestrial networks (NTNs) such as 3GPP satellite networks.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for a wireless device to perform gradual timing adjustments in a non-terrestrial wireless communication system.

According to the techniques described herein, a wireless device may temporarily change the rate at which gradual timing adjustments are performed by the wireless device, for example to facilitate recovery from potential double correction to the uplink timing for the wireless device due to use of both an open loop timing advance and a closed loop timing advance.

At least in some instances, the gradual timing adjustment rate change for the wireless device may be triggered based at least in part on an open loop timing advance change. When such a gradual timing adjustment rate change is triggered, the wireless device may slow down the gradual timing adjustment rate used to modify its uplink transmission timing to reduce a transmission timing error parameter that encompasses the difference between the uplink transmission timing and the reference uplink timing for the wireless device, as one possibility. Slowing down the gradual timing adjustment rate in such a scenario may potentially allow for a closed loop timing advance command to be received that effectively modifies the reference uplink timing to remedy any possible negative impact from double correction on the reference uplink timing while less negative impact from double correction has occurred than if a default gradual timing adjustment rate were used.

Alternatively, when such a gradual timing adjustment rate change is triggered, the wireless device may speed up the gradual timing adjustment rate used to modify its uplink transmission timing to reduce a transmission timing error parameter that encompasses the difference between the uplink transmission timing and the reference uplink timing for the wireless device, as another possibility. Speeding up the gradual timing adjustment rate in such a scenario may potentially allow for a closed loop timing advance command to be received that effectively modifies the reference uplink timing to remedy any possible negative impact from double correction on the reference uplink timing more quickly than if a default gradual timing adjustment rate were used.

The gradual timing adjustment rate may be modified for a certain period of time after the gradual timing adjustment rate change is triggered. After that period of time comes to an end, the wireless device may resume using a previous (e.g., default) gradual timing adjustment rate to adjust its uplink transmission timing, e.g., as needed to keep the transmission timing error parameter below a configured threshold.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
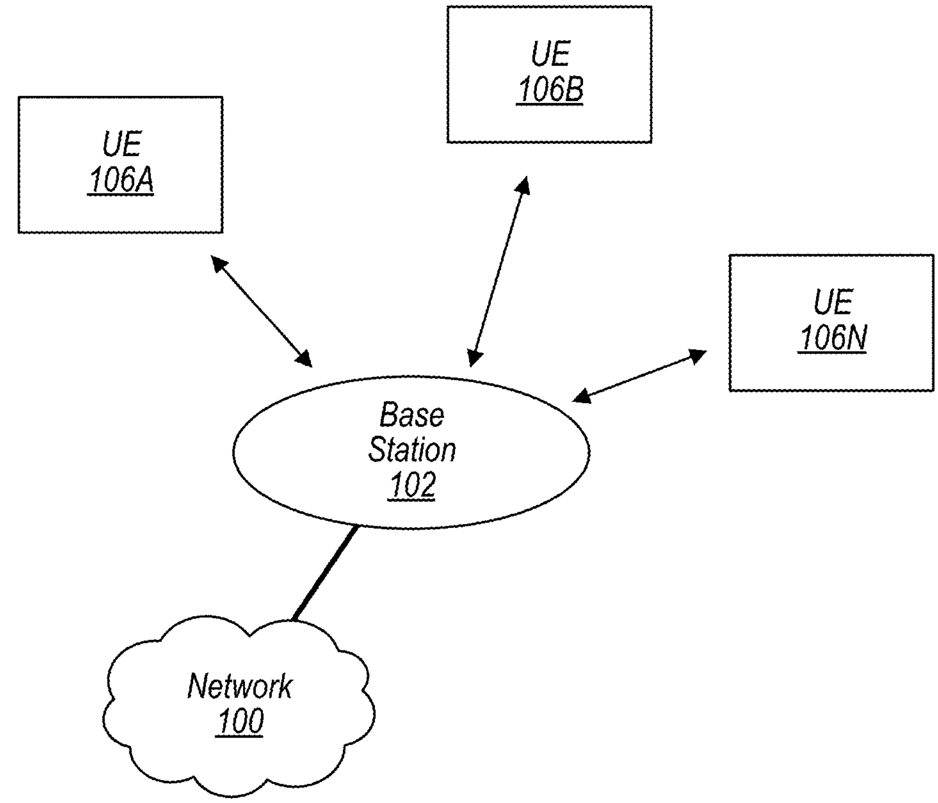
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
NTN: Non-terrestrial Network
TX: Transmission/Transmit
RX: Reception/Receive
RAT: Radio Access Technology
TRP: Transmission-Reception-Point
TA: Timing Advance
DCI: Downlink Control Information

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
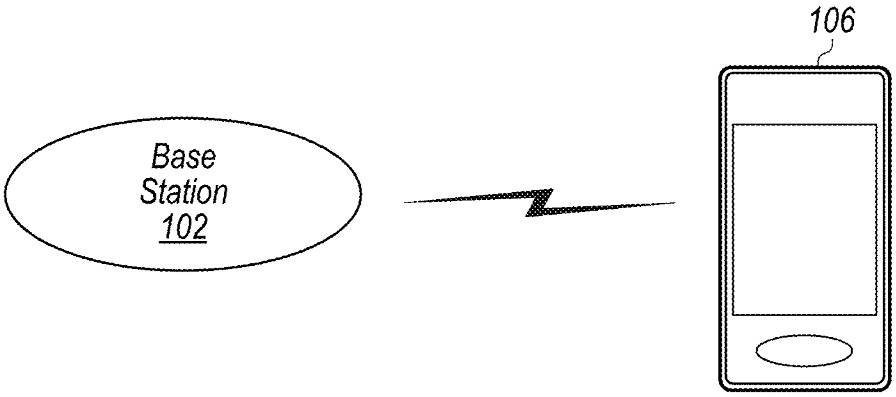
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for a wireless device to perform gradual timing adjustments in a non-terrestrial wireless communication system, such as according to the various methods described herein. The UE 106 might also or alternatively be configured to communicate using WLAN, BLU- ETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
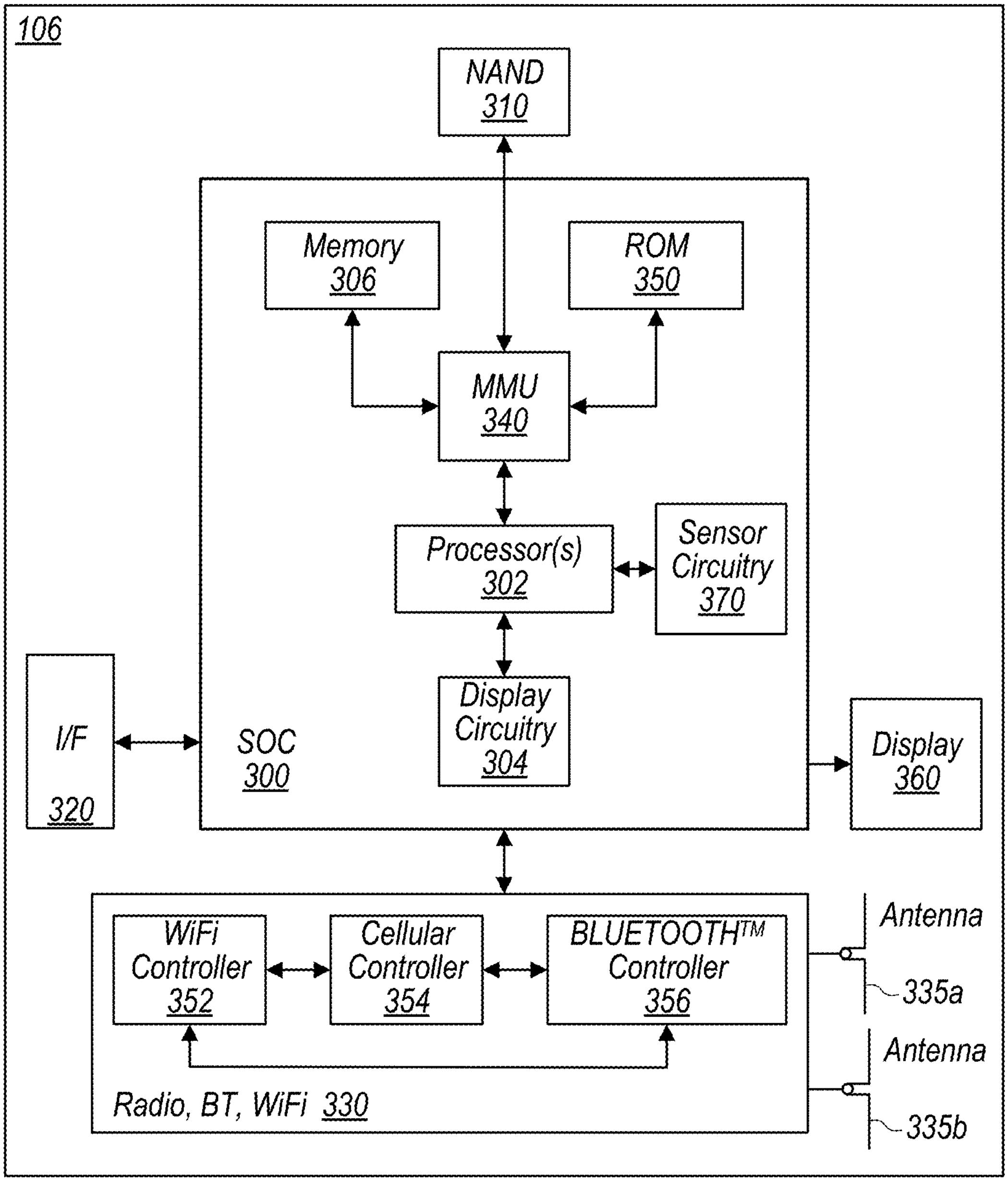
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform gradual timing adjustments in a non-terrestrial wireless communication system in a wireless communication system, such as described further subsequently herein. The processor (s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform gradual timing adjustments in a non-terrestrial wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
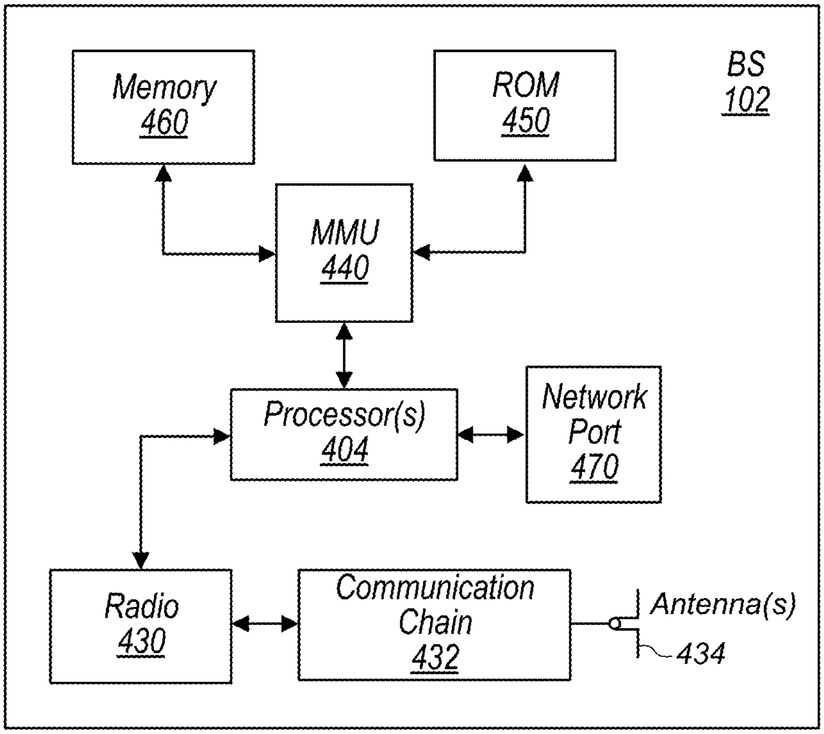
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

FIGS. 5-7—3GPP Satellite Network Infrastructure

Figure 5:
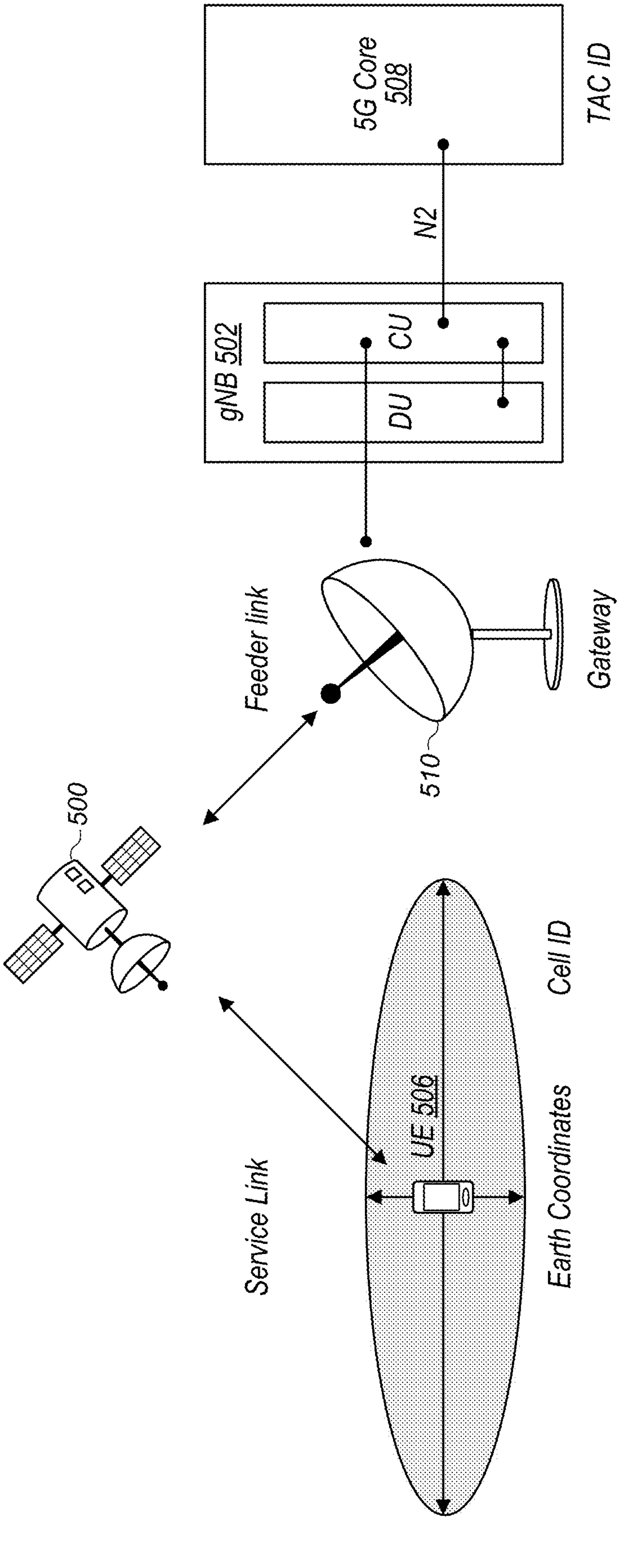
FIG. 5 is a network infrastructure diagram illustrating aspects of an exemplary 3GPP satellite network deployment, according to some embodiments.

FIG. 5 is a network infrastructure diagram illustrating a 3GPP satellite network deployment, according to some embodiments. As illustrated, a satellite 500 broadcasts a service link to a UE 506, where the UE 506 is operating within a cell. The satellite 500 also conducts communications with a terrestrial gateway 510 via a feeder link, and the gateway 510 is in turn communicatively coupled to a base station 502 (e.g., a gNB). The base station 502 includes a distributed unit (DU) and a centralized unit (CU). The base station 502 is then coupled to a 5G Core Network (5GC) 508 with a tracking area code (TAC) via an N2 interface. Note that the satellite 500 may include any of various types of satellites, for example such as a geosynchronous equatorial orbit (GEO) satellite, a low earth orbit (LEO) satellite, or a medium earth orbit (MEO) satellite, among various possibilities.

Figure 6:
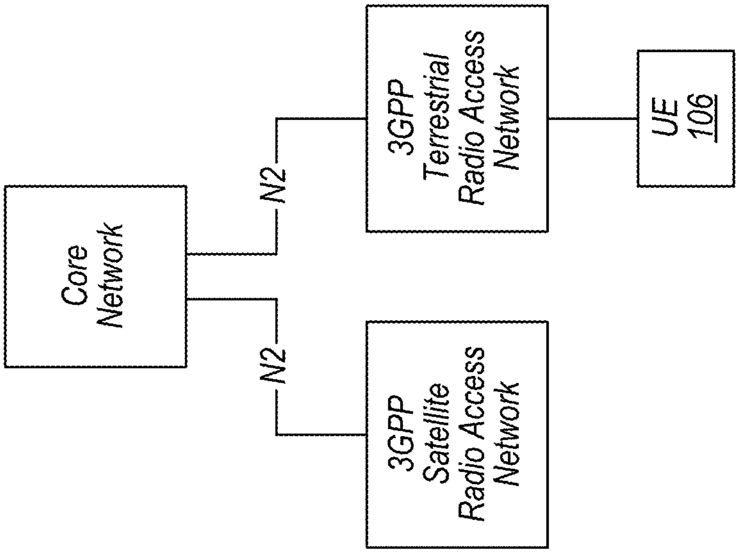
FIGS. 6-7 are schematic diagrams illustrating possible interworking between 3GPP terrestrial and satellite radio access networks (RANs), according to some embodiments.
Figure 7:
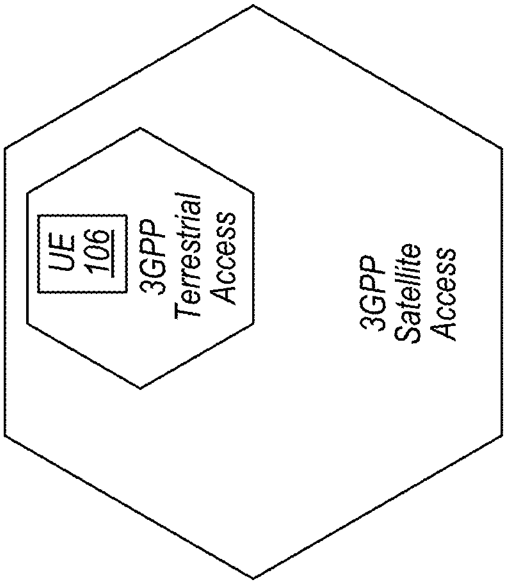

FIGS. 6-7 are schematic diagrams illustrating interworking between 3GPP terrestrial and satellite radio access networks (RANs), according to some embodiments. As illustrated, in FIG. 6, a UE 106 communicates with a 3GPP terrestrial RAN, e.g., through a gNB as shown in FIGS. 1-2. The 3GPP terrestrial RAN is coupled via an N2 interface with a core network, and a 3GPP satellite RAN is also coupled to the core network via the N2 interface. FIG. 7 illustrates a UE 106 operating with a cell to obtain 3GPP terrestrial access. The UE 106 also operates within a broader geographic range that provides 3GPP satellite access.

Figure 8:
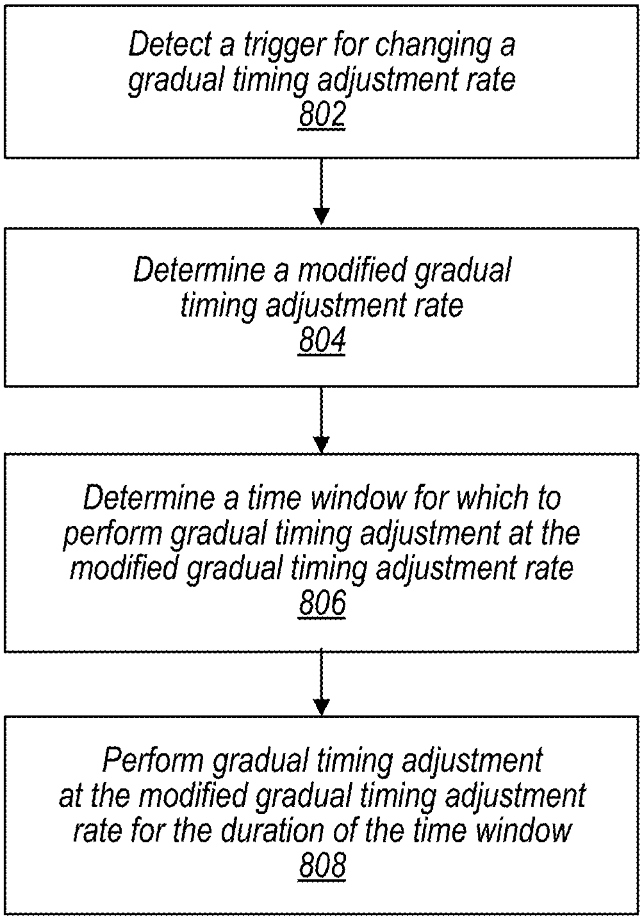
FIG. 8 is a flowchart diagram illustrating aspects of an exemplary possible method for a wireless device to perform gradual timing adjustments in a non-terrestrial wireless communication system, according to some embodiments.

FIG. 8—Gradual Timing Adjustment for Wireless Devices in a Non-Terrestrial Network In a wireless communication system that includes non-terrestrial elements (which may be referred to herein as a non-terrestrial network or NTN, even if one or more elements of the system are terrestrially based, as may be common) such as satellites, high altitude platforms, aircrafts, etc., it may be the case that the importance of using appropriate transmission timing is increased relative to purely terrestrial wireless communication systems, at least in some instances. This may be the case at least in part due to the potential for multiple links (e.g., including a feeder link and a service link, in the illustrated scenario of FIG. 5) and/or a greater overall distance between a wireless device being served and a cellular base station serving the wireless device, which can lead to greater round trip transmission times. This may additionally or alternatively be the case at least in part due to the potential for greater variation in relative positioning of the elements in the system for a system that includes a (possibly non-geo-stationary) satellite as a relay in a wireless link between a wireless device and a cellular base station relative to an entirely terrestrial system and/or a system that doesn't include a relay element.

It may be possible for either or both of a closed loop approach or an open loop approach to be used to manage wireless device timing adjustments in a non-terrestrial network. However, in case both types of approach are used, there may be potential for "double-corrections" to occur. A "double-correction" may include a scenario in which the uplink reference timing is actually incorrect, for example due to both the open loop and closed loop components of the uplink reference timing having been modified to account for the same system element (e.g., satellite) positioning changes. Such a double correction and corresponding incorrect uplink reference timing could negatively impact the accuracy of the transmission timing for a wireless device in such a system, if techniques for handling such a scenario are not provided.

One possibility for providing techniques for handling double correction scenarios may include an approach in which timing adjustments to bridge any difference between the reference uplink timing and the actual uplink timing are performed gradually, and possibly further in which the rate at which the gradual adjustments are performed can be changed. To illustrate one such set of possible techniques, FIG. 8 is a flowchart diagram illustrating a method for a wireless device to perform gradual timing adjustments in a non-terrestrial wireless communication system, at least according to some embodiments.

Aspects of the method of FIG. 8 may be implemented by a wireless device, e.g., in conjunction with one or more cellular base stations, such as a UE 106 and a BS 102 illustrated in and described with respect to various of the Figures herein, or UE 506, satellite 500, and gNB 502 illustrated in FIG. 5, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 8 are described in a manner relating to the use of communication techniques and/or features associated with 3GPP and/or NR specification documents, such description is not intended to be limiting to the disclosure, and aspects of the method of FIG. 8 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 8 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

At least according to some embodiments, the wireless link may include multiple hops. For example, the wireless link may be established using one or more non-terrestrial network elements, such as a satellite, as a relay device. In such a scenario, the wireless link between the wireless device and the cellular base station may include a service link (e.g., between the wireless device and the satellite) and a feeder link (e.g., between the satellite and a cellular base station or another network element communicatively coupled with a cellular base station). Thus, the wireless device and the satellite may directly wirelessly communicate via the service link, and the satellite may relay those communications with the cellular base station via the feeder link.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, serving satellite mobility, changing wireless medium conditions, and/or for any of various other possible reasons.

At least in some instances, establishing the wireless link(s) may include the wireless device providing capability information for the wireless device. Such capability information may include information relating to any of a variety of types of wireless device capabilities.

In 802, the wireless device may detect a trigger for changing a gradual timing adjustment rate. The trigger may include any of various possible events, conditions, and/or indications, among various possibilities. One possible trigger may include a change to one or more portions of an open loop timing advance for the wireless device. At least according to some embodiments, the open loop timing advance may include a common timing advance parameter received from the cellular network. The common timing advance parameter may be configured per cell/beam, and may relate to the delay associated with the feeder link between that satellite and the cellular base station, e.g., that may be common to all wireless devices served by a service link with the satellite. Thus, according to some embodiments, if the common timing advance parameter is changed by the network (e.g., due to satellite movement relative to the cellular base station), this could be one possible trigger for changing the gradual timing adjustment rate at the wireless device. Another possible aspect of the open loop timing advance may include a wireless device specific timing advance change. The wireless device specific timing advance change may be autonomously implemented by the wireless device to respond to changes in relative positioning of the wireless device and the satellite, e.g., that may affect the delay associated with the service link between the wireless device and the satellite. Thus, according to some embodiments, if the wireless device specific timing advance parameter is changed by the wireless device (e.g., due to detection of a change to wireless device and/or satellite position by the wireless device), this could be one possible trigger for changing the gradual timing adjustment rate at the wireless device.

In some embodiments, triggering changing the gradual timing adjustment rate at the wireless device may further depend on one or more conditions, e.g., in addition to detection of one or more events such as an open loop timing advance change. Such conditions could relate to the magnitude and/or frequency of the open loop timing advance change(s) implemented by the wireless device, according to some embodiments. For example, as one possibility, the trigger for changing the gradual timing adjustment rate could be conditional on whether open loop timing advance change has occurred that is greater than an open loop timing advance change threshold. The threshold could be predefined (e.g., in standard specifications), or could be configured by the network, among various possibilities. As another possibility, the trigger for changing the gradual timing adjustment rate could be conditional on whether the frequency of open loop timing advance changes is greater than an open loop timing advance change frequency threshold. Similarly, this threshold could be predefined, or could be configured by the network, among various possibilities. Thus, according to some embodiments, if an open loop timing advance change occurs that meets the one or more configured conditions to trigger changing the gradual timing adjustment rate at the wireless device, the wireless device may be triggered to change its gradual timing adjustment rate.

Additionally, or alternatively, it may be possible that the trigger to change the gradual timing adjustment rate at the wireless device depends on control information from the cellular network. For example, it may be possible that the wireless device receives an indication to change the gradual timing adjustment rate from the cellular base station, which may (e.g., in conjunction with detection of a trigger event such as an open loop timing advance change, or possibly independently of any other such trigger event) trigger the wireless device to change its gradual timing adjustment rate.

In 804, the wireless device may determine a gradual timing adjustment rate for the gradual timing adjustment. The gradual timing adjustment rate change may be autonomously determined, and/or may be determined based on control information received from the cellular network. For example, the wireless device may autonomously determine or be instructed by the network to slow down the gradual timing adjustment rate, e.g., from a first gradual timing adjustment rate (e.g., a "default" gradual timing adjustment rate) to a second gradual timing adjustment rate (e.g., a "slow" gradual timing adjustment rate, as one possibility. Such a change to the gradual timing adjustment rate may reduce the speed at which the wireless device drifts away from an ideal timing advance in case the open loop timing advance change implemented by the wireless device together with the accumulated closed loop timing advance commands received from the cellular network are "double correcting" the timing for the wireless device (e.g., and resulting in an incorrect reference uplink timing), such that the network can detect the timing drift and compensate with an update to the closed loop timing advance (which may correct the reference uplink timing) while less drift has occurred than if the default gradual timing adjustment rate were used.

As another possibility, the wireless device may autonomously determine or be instructed by the cellular network to speed up the gradual timing adjustment rate, e.g., from a first gradual timing adjustment rate (e.g., the "default" gradual timing adjustment rate) to a second gradual timing adjustment rate (e.g., a "fast" gradual timing adjustment rate, as one possibility. Such a change to the gradual timing adjustment rate may increase the speed at which the wireless device actual timing approaches the reference timing, which may speed detection of a double correction scenario (e.g., in which the reference uplink timing is incorrect) by the network and thereby result in the network compensating with an update to the closed loop timing advance (e.g., which may correct the reference uplink timing) more quickly than if the default gradual timing adjustment rate were used. It should be noted, though, that such a faster gradual timing adjustment rate could possibly result in a greater error to the uplink timing from double correction occurring before the closed loop timing advance update to correct the uplink reference timing for the wireless device is received, and/or could require a higher network complexity to allow for support of a greater range of wireless device uplink timings, e.g., in comparison to the default or slow gradual timing adjustment rates.

Note that the various possible gradual timing adjustment rates (e.g., "default", "slow", "fast", etc.) may be configured by the network, predefined, or may be up to wireless device implementation, among various possibilities, at least in some instances. Note also that while three gradual timing adjustment rates are described herein, different numbers (e.g., fewer or more) of gradual timing adjustment rates could additionally or alternatively be possible and should be considered within the scope of the embodiments described herein.

In 806, the wireless device may determine a time window for which to perform gradual timing adjustment at the determined gradual timing adjustment rate. The time window may be determined in any of a variety of possible ways. As one possibility, the time window for using a modified gradual timing adjustment rate when a change in gradual timing adjustment rate is triggered may be pre-defined (e.g., in 3GPP standard specifications or otherwise). As another possibility, the network may configure the time window for using a modified gradual timing adjustment rate when a change in gradual timing adjustment rate is triggered, e.g., by providing an indication of the time window for which to perform gradual timing adjustment at the modified rate. The indication may be cell specific (e.g., applicable for all wireless devices served by the cell and with the corresponding capability, for all trigger events for modifying the gradual timing adjustment rate), wireless device specific and applicable for all trigger events for modifying the gradual timing adjustment rate, or wireless device specific and applicable for a specific trigger event for modifying the gradual timing adjustment rate, among various possibilities.

As a further possibility, the time window may be indefinite, and may last until an indication to end the time window is received and/or a condition configured to end the time window occurs. For example, in some instances, it may be possible that the cellular base station provides (e.g., after some amount of time at the modified gradual timing adjustment rate has occurred) an indication to stop performing gradual timing adjustment at the modified gradual timing adjustment rate. In such a scenario, the time window for which to perform gradual timing adjustment at the modified gradual timing adjustment rate may be determined as lasting from the trigger to perform gradual timing adjustment at the modified gradual timing adjustment rate until the indication to stop performing gradual timing adjustment at the modified gradual timing adjustment rate is received.

As another example, in some instances, the time window may be configured to last until a closed-loop timing advance command is received by the wireless device. In such a scenario, the time window for which to perform gradual timing adjustment at the modified gradual timing adjustment rate may be determined as lasting from the trigger to perform gradual timing adjustment at the modified gradual timing adjustment rate until the indication of the closed loop timing advance is received from the network.

As still another example, in some instances, the time window may be configured to last until a certain accumulated amount of gradual timing adjustment is implemented by the wireless device after an open loop timing advance change. The required accumulated amount may be configured by the network, predefined in standard specifications, or based on one or more conditions such as by how much the open loop timing advance changed or by how much the accumulated closed loop timing advance changed between the previous open loop timing advance change and the open loop timing advance change triggering the gradual timing adjustment rate change. In such a scenario, the time window for which to perform gradual timing adjustment at the modified gradual timing adjustment rate may be determined as lasting from the trigger to perform gradual timing adjustment at the modified gradual timing adjustment rate until the accumulated amount of gradual timing adjustment implemented by the wireless device reaches the configured threshold.

In 808, the wireless device may perform gradual timing adjustment at the modified gradual timing adjustment rate for the duration of the time window. The gradual timing adjustment may include the wireless device adjusting its uplink timing from its current uplink timing towards a reference uplink timing in accordance with (e.g., limited by) the modified gradual timing adjustment rate. In other words, the wireless device may modify its uplink timing to reduce the "transmission timing error," which may be defined as the difference between the actual uplink transmission timing used and the reference uplink timing (which may in turn be determined based at least in part on the open loop timing advance and the accumulated closed loop timing advance, at least in some instances), at the modified gradual timing adjustment rate, at least according to some embodiments.

Note that the modified gradual timing adjustment rate may be characterized in any of various possible ways. As one possible example, the modified gradual timing adjustment rate may include a limit to the maximum amount of the magnitude of the timing change that can be performed in one adjustment. In some instances, for the "slow" gradual timing adjustment rate this limit may be equal to or lesser than the corresponding limit for the "default" gradual timing adjustment rate, while for the "fast" gradual timing adjustment rate this limit may be equal to or greater than the corresponding limit for the "default" gradual timing adjustment rate. As another possible example, the modified gradual timing adjustment rate may include a minimum aggregate adjustment rate for changing the uplink timing for the wireless device. In some instances, for the "slow" gradual timing adjustment rate this minimum aggregate adjustment rate may be equal to or lesser than the corresponding minimum aggregate adjustment rate for the "default" gradual timing adjustment rate, while for the "fast" gradual timing adjustment rate this minimum aggregate adjustment rate may be equal to or greater than the corresponding minimum aggregate adjustment rate for the "default" gradual timing adjustment rate. As a still further possible example, the modified gradual timing adjustment rate may include a maximum aggregate adjustment rate for changing the uplink timing for the wireless device. In some instances, for the "slow" gradual timing adjustment rate this maximum aggregate adjustment rate may be equal to or lesser than the corresponding maximum aggregate adjustment rate for the "default" gradual timing adjustment rate, while for the "fast" gradual timing adjustment rate this maximum aggregate adjustment rate may be equal to or greater than the corresponding maximum aggregate adjustment rate for the "default" gradual timing adjustment rate.

Once the duration of the time window is complete, the wireless device may resume performing any further uplink timing adjustments (e.g., if needed) at the default gradual timing adjustment rate. Note that the wireless device may be able to repeat the method of FIG. 8, e.g., in response to multiple triggers to change the gradual timing adjustment rate occurring at various times over the course of a wireless communication session between the wireless device and the cellular base station via a NTN based wireless link, at least according to some embodiments.

Thus, at least according to some embodiments, the method of FIG. 8 may be used to provide a framework according to which a wireless device can perform gradual timing adjustments at multiple different gradual timing adjustment rates in a non-terrestrial wireless communication system, at least in some instances.

Additional Information

The following additional information describes further aspects that might be used in conjunction with the method of FIG. 8 if desired. It should be noted, however, that the exemplary details described in the following section are not intended to be limiting to the disclosure as a whole: numerous variations and alternatives to the details provided herein below are possible and should be considered within the scope of the disclosure.

It may be possible for a wireless device to apply both a closed loop timing advance (TA) and an open loop TA for UE uplink transmissions in a NTN, at least according to some embodiments. In such a scenario, it may be important to address the possibility for double-correction to occur (e.g., in which both the closed loop TA and the open loop TA are adjusted to account for the same change in system conditions, potentially resulting in an over-correction to UE uplink timing). One approach may include to implement any determined timing adjustments at a gradual rate, which may allow the possibility for any timing accuracy drift due to double correcting to be detected and reversed while less timing accuracy drift has occurred than if determined timing adjustments were implemented all at once.

The gradual timing adjustment may be performed when the transmission timing error between the UE and the reference timing exceeds a certain threshold ("$T_{e,NTN}$"). When this condition is met, the UE may be required to adjust its timing to within the configured threshold. The adjustments to the UE uplink timing may follow a specified set of rules to limit the rate of the timing adjustment, such as that the maximum amount of the magnitude of the timing change in one adjustment may be limited to a certain value ("$T_{q,NTN}$"), that the minimum aggregate adjustment rate may be specified as a certain rate ("$T_{p,NTN}$" per "X" ms), and/or that the maximum aggregate adjustment rate may be specified as a certain rate ("$T_{q,NTN}$" per "Y" ms).

The reference timing may also be specified. As one possible option, the definition of the reference timing may be $T_{TA}$ before the downlink timing of the reference cell, where $T_{TA}$ is defined in the following manner.

$$T_{TA}=(N_{TA}+N_{TA,UE\text{-}specific}+N_{TA,common}+N_{TA,offset})\times T_C$$

where:

$N_{TA}$ is defined as 0 for PRACH and updated based on a TA command field in msg2/msgB and MAC CE TA command;

$N_{TA,UE\text{-}specific}$ is the UE self-estimated TA to pre-compensate for the service link delay;

$N_{TA,common}$ is the network-controlled common TA, and may include any timing offset considered necessary by the network; $N_{TA,common}$ with a value of 0 may be supported; and $N_{TA,offset}$ is a fixed offset used to calculate the timing advance.

In this framework, the open loop TA may include the common TA and the UE specific TA adjustment portions, and the closed loop TA may include the accumulated TA based on network TA commands. According to the techniques described herein, it may be possible to handle double corrections to such reference timing without artificially changing the accumulated (closed loop) TA in the reference timing by making use of UE gradual timing adjustments, including providing support for changing the rate at which gradual timing adjustment is performed.

An event triggered framework for performing gradual timing adjustment change may be used, as one possibility. In such a framework, the trigger event could include when the open loop TA is changed, which may occur due to common TA change (e.g., from a network command) or a UE specific TA change (e.g., which may be UE initiated, for example based on a change in distance detected between a UE and a serving satellite) or both. When such a trigger event occurs, the UE may maintain the accumulated TA adjustments (closed loop TA), and may only change the open loop TA for the reference timing of gradual timing adjustment.

Based on the trigger event, the UE may slow down or speed up the gradual timing adjustment for a certain period of time. For a scenario in which the UE slows down the gradual timing adjustment for a period of time, the time period may be specified (e.g., in 3GPP technical specifications) or configured (e.g., by the network, in a cell specific or UE specific manner) according to any of a variety of possible design schemes. As one possibility, the gradual timing adjustment rate change may be in effect for a window or timer length that is pre-defined in the standard. As another possibility, the gradual timing adjustment rate change may be in effect for a window or timer length that is configured by the network. As a further possibility, the time period may be indefinite in length, and may last until the UE receives a network indication for stopping use of the slower gradual timing adjustment rate. As yet another possibility, the time period may last until the UE receives a closed loop TA command from the network. After the end of the time period for the slower gradual timing adjustment rate, the UE may resume use of a default gradual timing adjustment rate, at least according to some embodiments.

The "slow" gradual timing adjustment rate may be designed to be slower than the default gradual timing adjustment rate in a variety of ways. As one possibility, according to the slow gradual timing adjustment rate, all adjustments made to the UE uplink timing adhere to the following rules. The maximum amount of the magnitude of the timing change in one adjustment may be limited to a certain value (e.g., "$T_{q,NTN\_slow}$") that is less than or equal to the corresponding value for the default gradual timing adjustment rate (i.e., $T_{q,NTN\_slow} \le T_{q,NTN}$). The minimum aggregate adjustment rate may be specified as a certain rate (e.g., "$T_{p,NTN\_slow}$" per "X" ms, "$T_{p,NTN}$" per "$X_{\_slow}$" ms, or "$T_{p.,NTN\_slow}$" per "$X_{\_slow}$" ms) that is less than or equal to the corresponding rate for the default gradual timing adjustment (i.e., $T_{p,NTN\_slow} \le T_{p,NTN}$ and/or $X \le X_{slow}$). The maximum aggregate adjustment rate may be specified as a certain rate (e.g., "$T_{q,NTN\_slow}$" per "Y" ms, "$T_{q,NTN}$" per "$Y_{slow}$" ms, or "$T_{q,NTN\_slow}$" per "$Y_{slow}$" ms) that is less than or equal to the corresponding rate for the default gradual timing adjustment (i.e., $T_{q,NTN\_slow} \leq T_{q,NTN}$ and/or $Y \leq Y_{slow}$).

For a scenario in which the UE speeds up the gradual timing adjustment for a period of time, the time period may also be specified (e.g., in 3GPP technical specifications) or configured (e.g., by the network, in a cell specific or UE specific manner) according to any of a variety of possible design schemes. As one possibility, the gradual timing adjustment rate change may be in effect for a window or timer length that is pre-defined in the standard. As another possibility, the gradual timing adjustment rate change may be in effect for a window or timer length that is configured by the network. As a further possibility, the time period may be indefinite in length, and may last until the UE receives a network indication for stopping use of the faster gradual timing adjustment rate. As yet another possibility, the time period may last until the UE receives a closed loop TA command from the network. As a still further possibility, the timer period may end when the accumulated gradual timing adjustment after open loop TA change reaches a certain threshold. The threshold could be configured by the network, or predefined in standard specifications, or could be based on UE scenario specific conditions, such as by how much the open loop TA is changed and/or by how much the accumulated closed loop TA is changed between the previous open loop TA change and the current open loop TA change. After the end of the time period for the faster gradual timing adjustment rate, the UE may resume use of a default gradual timing adjustment rate, at least according to some embodiments.

The "fast" gradual timing adjustment rate may be designed to be faster than the default gradual timing adjustment rate in a variety of ways. As one possibility, according to the fast gradual timing adjustment rate, all adjustments made to the UE uplink timing adhere to the following rules. The maximum amount of the magnitude of the timing change in one adjustment may be limited to a certain value (e.g., "$T_{q,NTN\_fast}$") that is greater than or equal to the corresponding value for the default gradual timing adjustment rate (i.e., $T_{q,NTN\_fast} \geq T_{q,NTN}$). The minimum aggregate adjustment rate may be specified as a certain rate (e.g., "$T_{p,NTN\_fast}$" per "X" ms, "$T_{p,NTN}$" per "$X_{\_fast}$" ms, or "$T_{p,NTN\_fast}$" per "$X_{\_fast}$" ms) that is greater than or equal to the corresponding rate for the default gradual timing adjustment (i.e., $T_{p,NTN\_fast} \geq T_{p,NTN}$ and/or $X \geq X_{fast}$). The maximum aggregate adjustment rate may be specified as a certain rate (e.g., "$T_{q,NTN\_fast}$" per "Y" ms, "$T_{q,NTN}$" per "$Y_{fast}$" ms, or "$T_{q,NTN\_fast}$" per "$Y_{fast}$" ms) that is greater than or equal to the corresponding rate for the default gradual timing adjustment (i.e., $T_{q,NTN\_fast} \geq T_{q,NTN}$ and/or $Y \geq Y_{fast}$).

Another possible framework for performing gradual timing adjustment changes that may be used could include a conditional event triggered framework. As in an unconditional event triggered framework, the trigger event could include when the open loop TA is changed, which may occur due to common TA change, or a UE specific TA change, or both. When such a trigger event occurs, the UE may check whether the condition(s) for changing the gradual timing adjustment rate is (are) met. One possible such condition could include whether the open loop TA change reaches a certain threshold. This threshold could be configured by the network, or predefined in standard specifications, or could be based on UE scenario specific conditions, such as by how much the open loop TA is changed and/or by how much the accumulated closed loop TA is changed between the previous open loop TA change and the current open loop TA change. Another possible condition could include whether the frequency of open loop TA changes reaches a threshold. This threshold could be configured by the network, or predefined in standard specifications. This threshold may be defined in terms of the number of open loop TA change occasions that have occurred within the last time period "T", at least as one possibility. Other conditions are also possible.

If the configured condition(s) is (are) met, the UE may maintain the accumulated TA adjustments (closed loop TA), and may only change the open loop TA for the reference timing of gradual timing adjustment. The UE may slow down or speed up the rate of gradual timing adjustment for a certain period of time. The relation between the slow or fast gradual timing adjustment rate and the default gradual timing adjustment rate, as well as the time period for which the modified gradual timing adjustment rate is in use, may operate in a similar manner as described previously herein, at least according to some embodiments.

In some embodiments, a network controlled framework for performing gradual timing adjustment changes may be used. In such a framework, if a trigger event for possibly using a modified gradual timing adjustment rate occurs at a UE (e.g., if the open loop TA is changed, which may occur due to common TA change, or a UE specific TA change, or both), the UE may check whether the network indicates to perform a gradual timing adjustment rate change. As one option, upon receiving such a network provided indication to perform a gradual timing adjustment rate change, the UE may determine whether to use a slower gradual timing adjustment rate or a faster gradual timing adjustment rate. As another option, such a network provided indication to perform a gradual timing adjustment rate change may further include an indication of whether to use a slower gradual timing adjustment rate or a faster gradual timing adjustment rate.

When the UE receives such a network indication to change the gradual timing adjustment rate, the UE may maintain the accumulated TA adjustments (closed loop TA), and may only change the open loop TA for the reference timing of gradual timing adjustment. The UE may slow down or speed up (e.g., in accordance with the network indication, or as autonomously determined by the UE) the rate of gradual timing adjustment for a certain period of time. The relation between the slow or fast gradual timing adjustment rate and the default gradual timing adjustment rate, as well as the time period for which the modified gradual timing adjustment rate is in use, may operate in a similar manner as described previously herein, at least according to some embodiments.

In the following further exemplary embodiments are provided.

One set of embodiments may include a method, comprising: by a wireless device: establishing a non-terrestrial network (NTN) based wireless link with a cellular base station; detecting a trigger for changing a gradual timing adjustment rate from a first gradual timing adjustment rate to a second gradual timing adjustment rate; determining a time window for which to perform gradual timing adjustment at the second gradual timing adjustment rate; and performing gradual timing adjustment at the second gradual timing adjustment rate for the time window.

According to some embodiments, the trigger for changing the gradual timing adjustment rate includes one or more of receiving an indication of a common timing advance change or initiating an autonomous timing advance change.

According to some embodiments, the trigger for changing the gradual timing adjustment rate includes determining that an open loop timing advance change is greater than an open loop timing advance change threshold.

According to some embodiments, the trigger for changing the gradual timing adjustment rate includes determining that a frequency of open loop timing advance changes is greater than an open loop timing advance change frequency threshold.

According to some embodiments, the trigger for changing the gradual timing adjustment rate includes receiving an indication to change the gradual timing adjustment rate from the cellular base station.

According to some embodiments, the method further comprises: receiving an indication from the cellular base station to change the gradual timing adjustment rate from the first gradual timing adjustment rate to the second gradual timing adjustment rate.

According to some embodiments, the time window for which to perform gradual timing adjustment at the second gradual timing adjustment rate spans a length of time that is pre-defined in 3GPP standard specifications.

According to some embodiments, the method further comprises: receiving an indication of the time window for which to perform gradual timing adjustment at the second gradual timing adjustment rate from the cellular base station.

According to some embodiments, the method further comprises: receiving an indication to stop performing gradual timing adjustment at the second gradual timing adjustment rate, wherein the time window for which to perform gradual timing adjustment at the second gradual timing adjustment rate is determined based at least in part on the indication to stop performing gradual timing adjustment at the second gradual timing adjustment rate.

According to some embodiments, the method further comprises: receiving an indication of a closed-loop timing advance, wherein the time window for which to perform gradual timing adjustment at the second gradual timing adjustment rate is determined based at least in part on the indication of the closed-loop timing advance.

According to some embodiments, the time window for which to perform gradual timing adjustment at the second gradual timing adjustment rate is determined based at least in part on an accumulated amount of gradual timing adjustment implemented by the wireless device after the trigger for changing the gradual timing adjustment rate.

Another set of embodiments may include a wireless device, comprising: one or more processors; and a memory having instructions stored thereon, which when executed by the one or more processors, perform steps of any of the methods of the preceding examples.

A further set of embodiments may include a computer program product, comprising computer instructions which, when executed by one or more processors, perform steps of any of the methods of the preceding examples.

Still another set of embodiments may include a method, comprising: by a cellular base station: establishing a non-terrestrial network (NTN) based wireless link with a wireless device; and providing an indication to the wireless device to change a gradual timing adjustment rate for the NTN based wireless link.

According to some embodiments, the indication to the wireless device to change the gradual timing adjustment rate for the NTN based wireless link further indicates to change the gradual timing adjustment rate from a first gradual timing adjustment rate to a second gradual timing adjustment rate.

According to some embodiments, the method further comprises: providing an indication to the wireless device of a time window for which to change the gradual timing adjustment rate for the NTN based wireless link.

According to some embodiments, the method further comprises: providing an indication to the wireless device to stop changing the gradual timing adjustment rate for the NTN based wireless link.

According to some embodiments, the method further comprises: providing an indication to the wireless device of one or more of: a threshold configured for use by the wireless device to determine when to trigger changing the gradual timing adjustment rate for the NTN based wireless link; or a threshold configured for use by the wireless device to determine when to trigger stopping changing the gradual timing adjustment rate for the NTN based wireless link.

Yet another set of embodiments may include a cellular base station, comprising: one or more processors; and a memory having instructions stored thereon, which when executed by the one or more processors, perform steps of any of the methods of the preceding examples.

A yet further set of embodiments may include a computer program product, comprising computer instructions which, when executed by one or more processors, perform steps of any of the methods of the preceding examples.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:

by a wireless device:

establishing a non-terrestrial network (NTN) based wireless link with a cellular base station;

detecting a trigger for changing a gradual timing adjustment rate from a first gradual timing adjustment rate to a second gradual timing adjustment rate;

determining a time window for which to perform gradual timing adjustment at the second gradual timing adjustment rate, wherein the time window for which to perform gradual timing adjustment at the second gradual timing adjustment rate is determined based at least in part on an accumulated amount of gradual timing adjustment or closed-loop timing advance implemented by the wireless device after the trigger for changing the gradual timing adjustment rate; and performing gradual timing adjustment at the second gradual timing adjustment rate for the time window.

2. The method of claim 1, wherein the trigger for changing the gradual timing adjustment rate includes an open loop timing advance change, wherein the open loop timing advance change comprises one or more of receiving an indication of a common timing advance change or initiating a user equipment (UE) specific timing advance change.

3. The method of claim 1, wherein the trigger for changing the gradual timing adjustment rate includes determining that an open loop timing advance change is greater than an open loop timing advance change threshold.

4. The method of claim 1, wherein the trigger for changing the gradual timing adjustment rate includes determining that a frequency of open loop timing advance changes is greater than an open loop timing advance change frequency threshold.

5. The method of claim 1, wherein the trigger for changing the gradual timing adjustment rate includes receiving an indication to change the gradual timing adjustment rate from the cellular base station.

6. The method of claim 1, wherein the method further comprises:

receiving an indication from the cellular base station to change the gradual timing adjustment rate from the first gradual timing adjustment rate to the second gradual timing adjustment rate.

7. The method of claim 1, wherein the time window for which to perform gradual timing adjustment at the second gradual timing adjustment rate spans a length of time that is pre-defined in 3GPP standard specifications.

8. The method of claim 1, wherein the method further comprises:

receiving an indication of the time window for which to perform gradual timing adjustment at the second gradual timing adjustment rate from the cellular base station.

9. The method of claim 1, wherein the method further comprises:

receiving an indication to stop performing gradual timing adjustment at the second gradual timing adjustment rate, wherein the time window for which to perform gradual timing adjustment at the second gradual timing adjustment rate is determined based at least in part on the indication to stop performing gradual timing adjustment at the second gradual timing adjustment rate.

10. The method of claim 1, wherein the method further comprises:

receiving an indication of a closed-loop timing advance, wherein the time window for which to perform gradual timing adjustment at the second gradual timing adjustment rate is determined based at least in part on the indication of the closed-loop timing advance.

11. An apparatus, comprising one or more processors and memory configured to cause a wireless device to:

detect a trigger for changing a gradual timing adjustment rate for a non-terrestrial network (NTN) based wireless link with a cellular base station from a first gradual timing adjustment rate to a second gradual timing adjustment rate;

determine a time window for which to perform gradual timing adjustment at the second gradual timing adjustment rate, wherein the time window for which to perform gradual timing adjustment at the second gradual timing adjustment rate is determined based at least in part on an accumulated amount of gradual timing adjustment or closed-loop timing advance implemented by the wireless device after the trigger for changing the gradual timing adjustment rate; and perform gradual timing adjustment at the second gradual timing adjustment rate for the time window.

12. The apparatus of claim 11, wherein the trigger for changing the gradual timing adjustment rate includes an open loop timing advance change, wherein the open loop timing advance change comprises one or more of receiving an indication of a common timing advance change or initiating a user equipment (UE) specific timing advance change.

13. The apparatus of claim 11, wherein the trigger for changing the gradual timing adjustment rate includes one or more of:

an open loop timing advance change;

a determination that an open loop timing advance change is greater than an open loop timing advance change threshold;

a determination that a frequency of open loop timing advance changes is greater than an open loop timing advance change frequency threshold; or reception of an indication to change the gradual timing adjustment rate from the cellular base station.

14. The apparatus of claim 11, wherein the time window for which to perform gradual timing adjustment at the second gradual timing adjustment rate is determined based on one or more of:

a length of time that is pre-defined in 3GPP standard specifications;

an indication of the time window for which to perform gradual timing adjustment at the second gradual timing adjustment rate that is received from the cellular base station;

an indication to stop performing gradual timing adjustment at the second gradual timing adjustment rate that is received from the cellular base station;

an indication of a closed-loop timing advance; or an accumulated amount of gradual timing adjustment or closed-loop timing advance implemented by the wireless device after the trigger for changing the gradual timing adjustment rate.

15. A cellular base station, comprising:

one or more processors; and a memory having instructions stored thereon, which when executed by the one or more processors, cause the cellular base station to:

establish a non-terrestrial network (NTN) based wireless link with a wireless device; and provide an indication to the wireless device to change, for the NTN based wireless link and during a time window for which to perform the gradual timing adjustment at a second gradual timing adjustment rate, a gradual timing adjustment rate from a first gradual timing adjustment rate to the second gradual timing adjustment rate, wherein the time window for which to perform the gradual timing adjustment at the second gradual timing adjustment rate is based at least in part on an accumulated amount of gradual timing adjustment or closed-loop timing advance implemented by the wireless device after the indication for changing the gradual timing adjustment rate.

16. The cellular base station of claim 15, wherein when executed by the one or more processors, the instructions further cause the cellular base station to:

provide an indication to the wireless device of the time window for which to change the gradual timing adjustment rate for the NTN based wireless link.

17. The cellular base station of claim 15, wherein when executed by the one or more processors, the instructions further cause the cellular base station to:

provide an indication to the wireless device to stop changing the gradual timing adjustment rate for the NTN based wireless link.

18. The cellular base station of claim 15, wherein when executed by the one or more processors, the instructions further cause the cellular base station to:

provide an indication to the wireless device of one or more of:

a threshold configured for use by the wireless device to determine when to trigger changing the gradual timing adjustment rate for the NTN based wireless link; or a threshold configured for use by the wireless device to determine when to trigger stopping changing the gradual timing adjustment rate for the NTN based wireless link.

19. The cellular base station of claim 15, wherein the indication for changing the gradual timing adjustment rate includes an open loop timing advance change, wherein the open loop timing advance change comprises one or more of providing an indication of a common timing advance change or a user equipment (UE) specific timing advance change being initiated.

20. The cellular base station of claim 15, wherein the time window for which to perform gradual timing adjustment at the second gradual timing adjustment rate spans a length of time that is pre-defined in 3GPP standard specifications.

* * * * *